United States Patent
Shimomura et al.

(10) Patent No.: US 6,775,482 B1
(45) Date of Patent: Aug. 10, 2004

(54) LIGHT RECEIVER

(75) Inventors: Kenkichi Shimomura, Tokyo (JP); Katsuhiro Shimizu, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 530 days.

(21) Appl. No.: 09/654,055

(22) Filed: Sep. 1, 2000

(30) Foreign Application Priority Data

Feb. 28, 2000 (JP) .................................... P. 2000-051747

(51) Int. Cl.$^7$ .................. H04B 10/04; H04B 10/06
(52) U.S. Cl. ............... 398/183; 398/182; 398/188; 398/193; 398/195; 398/198; 398/200; 398/214
(58) Field of Search ............... 398/182, 183, 398/188, 191, 193, 202, 206, 208, 209, 214

(56) References Cited

PUBLICATIONS

Kawanishi et al, "Electronics Letters," Vol. 28, No. 5, pgs. 510–511 (Feb. 1992).
Otani et al, "The Institute of Electronics, Information and Communication Engineers," p. 360 (Sep. 7–10, 1999).

*Primary Examiner*—M. R. Sedighian
(74) *Attorney, Agent, or Firm*—Birch, Stewart, Kolasch & Birch, LLP

(57) ABSTRACT

Because the phase comparison of the light signal data row and the light clock signal, and the coding of the light signal by the light signal, are simultaneously conducted, the influence of the phase variation in the signal path is not affected in principle, and the optimum phase condition is automatically established/maintained, and thereby, the present invention operates as an all-light type light receiver by which the light data and light clock are reproduced. Further, because the electric signal used herein exists in the range from the DC to the frequency of the difference between the light signal data row and the light clock signal, problems peculiar to the high speed electric signal can be avoided.

26 Claims, 10 Drawing Sheets

LIGHT RECEIVER

BACKGROUND OF THE INVENTION

1. Field of the Invention

The present invention relates to a light receiver which reproduces and outputs a light clock signal synchronized with the light signal data row inputted by using a light saturable absorber, and the light data row.

2. Description of the Related Art

FIG. 11 is a light digital reproduction apparatus shown on B-12-21, 1999, by Ohtani (KDD) et al. in a great spring meeting of "The Institute of Electronics, Information and Communication Engineers (IEICE)", and the saturable absorption characteristic of the electric field absorption type light modulator (hereinafter, written as EA modulator, EA is an abbreviation for Electro-Absorption) is utilized. When the light input signal and the light clock pulse generated by the light pulse generator are inputted into the light saturable absorber, because the absorption saturation occurs when the input signal has the sufficient intensity corresponding to the characteristic of the light saturable absorber, the light pulse generated by the light pulse generator passes when the input light signal is "1", and when the input light signal is "0", it is absorbed and coding occurs. At this time, it is necessary that the light clock pulse which is the reproduced output light source, is in timed relationship with the input signal pulse in the optimum phase condition in the saturable absorber in which coding is conducted. In the conventional example, the clock electric signal in timed relationship with the repeated frequency of the input light signal data row is extracted from the light absorption current taken out from the electrode of the EA modulator which is the saturable absorber, and by the electric clock signal, the light modulator is driven, and the light clock pulse in timed relationship with the light input signal is generated.

In the coding of the light signal by the light signal using the light saturable absorber, it is necessary that the synchronization of both the light signals in the light saturable absorber is established, and the optimum phase relationship is always kept for them. In this case, as in the conventional example, when the process in which the synchronization clock electric signal is extracted once from the clock signal, and the clock electric signal is electrically/light converted, is passed through, because it is difficult that the phase variation in the clock signal path is intrinsically compensated for, and the same high speed operation as the light signal speed is required for the electric circuit, there is a problem that cost becomes high.

A light receiver according to the first invention has: a light clock pulse generation light source to control the repeated frequency of a light clock pulse by the input current or input voltage; a wave-branching means for wave-branching the light from the clock pulse generation light source into the first light and the second light, each having a wavelength $\lambda_2$; an output means for outputting the first light wave-branched by the wave-branching means to the output terminal of the light clock; a wave-composing means for wave-composing the second light wave-branched by the wave-branching means with the signal light, which has a wavelength $\lambda_1$, inputted from the input terminal; a light saturable absorber which absorbs the light wave-composed by the wave-composing means and outputs the photo current, and in which a light absorption coefficient is decreased corresponding to the light input level; an optical filter which separates the light with wavelength $\lambda_1$ and the light with wavelength $\lambda_2$, which are outputted from the light saturable absorber; a dither signal source for modulating the phase of the light pulse generated from the clock pulse generation light source by the dither signal; and a phase controller for controlling so that the phase of the light source generated by the light clock pulse generation light source and the phase of the signal light inputted from the input terminal are in timed relationship with 0°, according to the output of the light saturable absorber which generates the photo current, and the output of the dither signal source.

A light receiver corresponding to the second invention, which comprising: a light clock pulse generation light source to control the repeated frequency of a light clock pulse by the input current or input voltage; a wave-branching means for wave-branching the light from the clock pulse generation light source into the first light (wavelength $\lambda_2$) and the second light (wavelength $\lambda_2$); an output means for outputting the first light wave-branched by the wave-branching means to the output terminal of the light clock; a wave-composing means for wave-composing the second light wave-branched by the wave-branching means with the signal light (wavelength $\lambda_1$) inputted from the input terminal; a light saturable absorber whose light absorption coefficient is decreased corresponding to the light input level of the wave-composed light signal; an optical filter which separates the light of wavelength $\lambda 1$ and the light or wavelength $\lambda 2$ outputted from the light saturable absorber; a light receiving unit to electrically convert the separated light by the optical filter; a dither signal source for modulating the phase of the light pulse generated from the clock pulse generation light source by the dither signal; and a phase controller for controlling so that the phase of the light source generated by the light clock pulse generation light source and the phase of the signal light inputted from the input terminal are in timed relationship with 0°, according to the output of the light saturable absorber which generates the photo current, and the output of the dither signal source.

The light receiver according to the third invention, has a light variable delay unit to control a delay amount by the input current or the input voltage, and a dither signal source to modulate the light input signal by the dither signal.

The light receiver according to the fourth invention, has a light variable delay unit to control a delay amount by the input current or the input voltage, and a dither signal source to modulate the light input signal by the dither signal.

The light receiver according to the fifth invention has: the first light circulator which outputs the inputted light signal to the light saturable absorber, and outputs the light pulse reproduced in the light saturable absorber; the second light circulator to terminate the light signal outputted from the light saturable absorber, and output the light clock pulse to the light saturable absorber; a light clock pulse generation light source to control the repeated frequency of a light clock pulse by the input current or input voltage; a wave-branching means for wave-branching the light from the clock pulse generation light source into the first light and the second light; an output means for outputting the first light clock wave-branched by the wave-branching means to the output terminal; a reproduction means for outputting the second light clock wave-branched by the wave-branching means from the second light circulator to the light saturable absorber, wherein the light saturable absorber outputs the reproduced light signal through the first light circulator; and a phase controller for controlling so that the phase of the light source generated by the light clock pulse generation light source is in timed relationship with the phase of the signal light inputted from the input terminal, according to the output of the light saturable absorber to generate the photo current and the output of the dither signal source.

The light receiver according to the sixth invention has: the first light circulator to output the inputted signal light to the light saturable absorber; the second light circulator to terminate the light signal outputted from the light saturable absorber; a light clock pulse generation light source to control the repeated frequency of a light clock pulse by the input current or input voltage; a wave-branching means for wave-branching the light from the light clock pulse generation light source into the first light and the second light; an output means for outputting the first light wave-branched by the wave-branching means to the output terminal of the light clock; a light saturable absorber to output the second light clock wave-branched by the wave-branching means to the first light circulator; a light receiving unit to wave-branch the light signal from the first light circulator and to electrically convert it; and a phase controller for controlling so that the phase of the light source generated by the light clock pulse generation light source is in timed relationship with the phase of the signal light inputted from the input terminal, according to the output of the light receiving unit and the output of the dither signal source.

The light receiver according to the seventh invention has: a light variable delay unit to control a delay amount by the input current or the input voltage; and a dither signal source to modulate the phase of the light input signal by the dither signal.

The light receiver according to the eighth invention has: a light variable delay unit to control a delay amount by the input current or the input voltage; and a dither signal source to modulate the light input signal by the phase of the dither signal.

In the light receiver according to the ninth invention, the repeated frequency of the light clock pulse generation light source is 1/n (n is a natural number) of the input light signal bit rate.

DETAILED DESCRIPTION OF THE PRESENT INVENTION

Figure 1:
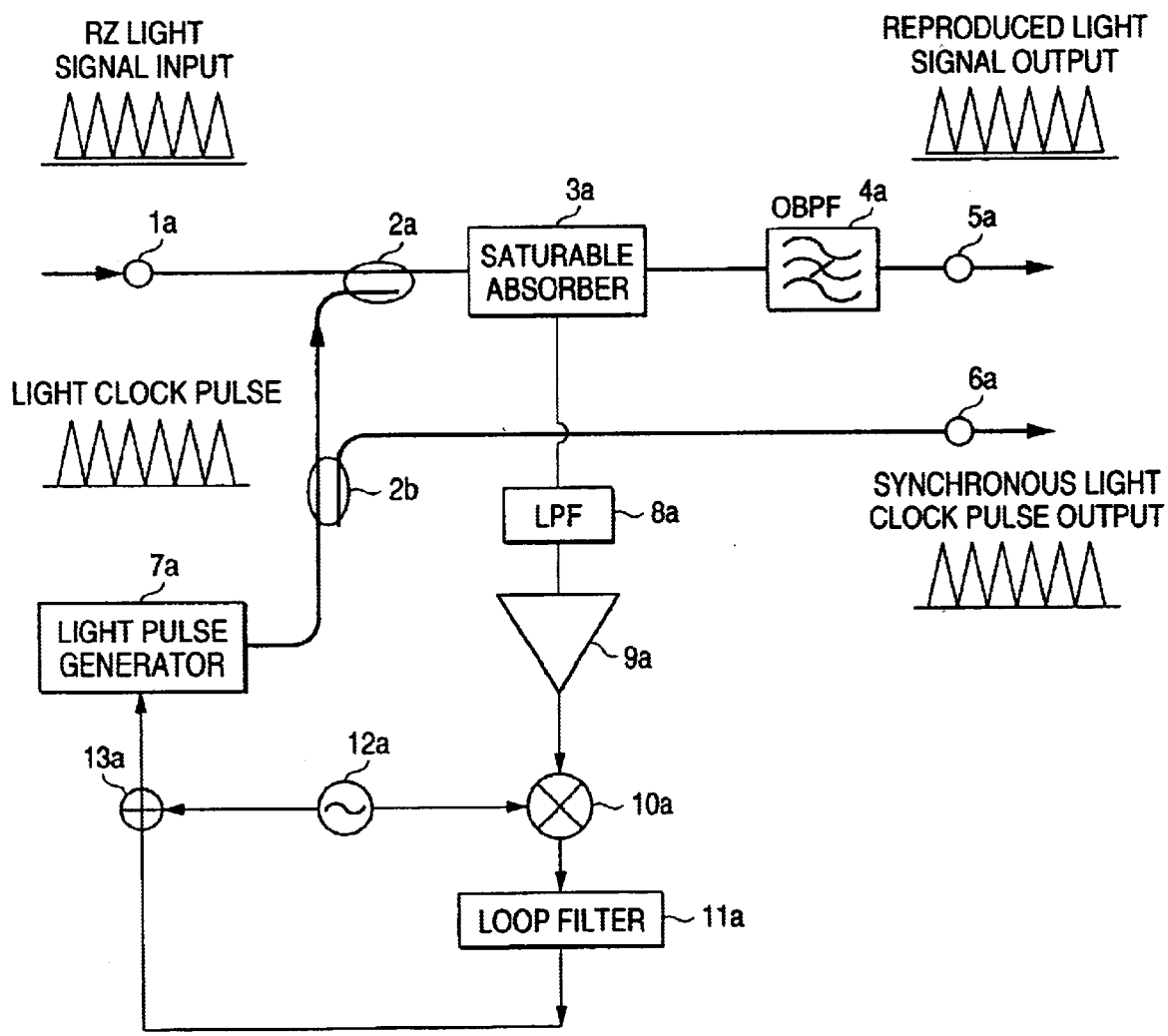
FIG. 1 is a block diagram showing an embodiment 1.

The present invention will be described in detail with reference to the accompanying drawings. In the drawings, each heavy line or arrow represents a flow of a light signal, and each thin line or arrow represents a flow of an electrical signal.

Embodiment 1

FIG. 1 is a structural block diagram showing a light receiver according to the present invention. In FIG. 1, numeral 1a is a light data input terminal, numerals 2a and 2b are light wave-composing and branching units, numeral 3a is a light saturable absorber, numeral 4a is an optical band pass filter (OBPF), numeral 5a is a light data output terminal, numeral 6a is a light clock output terminal, numeral 7a is a light pulse generator which can change the repeated frequency by the input current/voltage, numeral 8a is a low pass filter (LPF), numeral 9a is a reversible or irreversible amplifier, numeral 10a is a synchronous detector, numeral 11a is a loop filter, numeral 12a is a low frequency dither signal source, and numeral 13a is a current/voltage adder.

Figure 10:
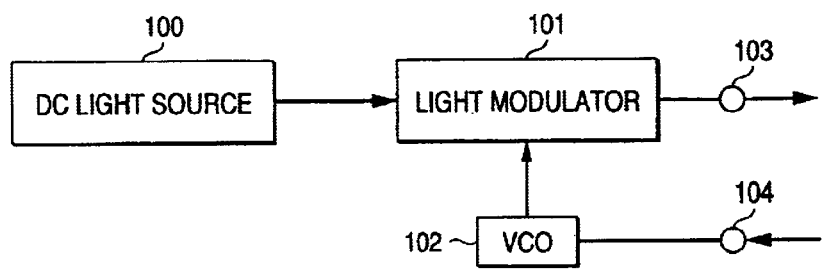
FIG. 10 is a block diagram showing an example of the structure of a light pulse generator.
Figure 11:
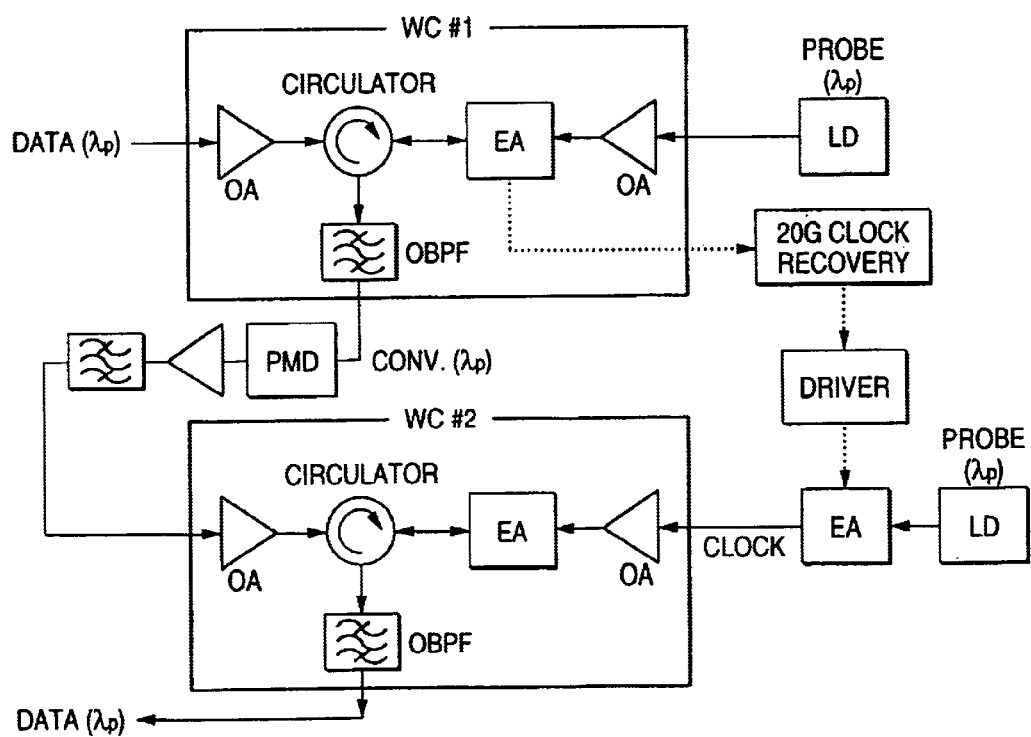
FIG. 11 is a block diagram showing the structure of the conventional example.

As light wave-composing and branching units 2a and 2b, a photo coupler, plane light waveguide path, wavelength multiple wave-composing and branching unit, can be used. The light saturable absorber, numeral 3a, is, for example, an EA modulator, or semiconductor light amplifier. The light pulse generator 7a is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation.

Next, the operation of FIG. 1 will be described. When the light clock pulse and the sufficiently intensive input signal light are inputted into the light saturable absorber, because the light clock pulse is coded by the signal light, the light absorption current taken out from the electrode includes the phase difference signal of two light signals. That is, because the light saturable absorber can be operated as the phase comparator of the light signal input and the electric signal output, when it is combined with the light pulse generator by which the repeated frequency can be electrically changed, the phase synchronous operation can be easily conducted in the same manner as the PLL in the general electric circuit.

In the condition that the ordinary PLL using the analog phase comparator establishes the phase synchronization, because the signal phase of the two signals whose phases are compared, is shifted by 90°, in FIG. 1, by the structure in which a slight phase modulation is added to the control signal of the light clock pulse by using the low frequency dither Signal source, and after the unnecessary high frequency component of the electric signal obtained from the saturable absorber electrode is removed by the low pass filter 8a, it is synchronous-detected and inputted into the loop filter, the phase comparison characteristic is equivalently differentiated, and the phase synchronization is established under the condition that the phase difference of two light signals is 0°. According to the operations described above, because the phase comparison of both the light signals and the coding of the light clock pulse by the light signal pulse are simultaneously conducted in one light saturable absorber, the embodiment shown in FIG. 1 operates as the light receiver (light 3R receiver) in which the phase adjustment is not necessary, and the high speed electric circuit is not necessary.

Embodiment 2

Figure 2:
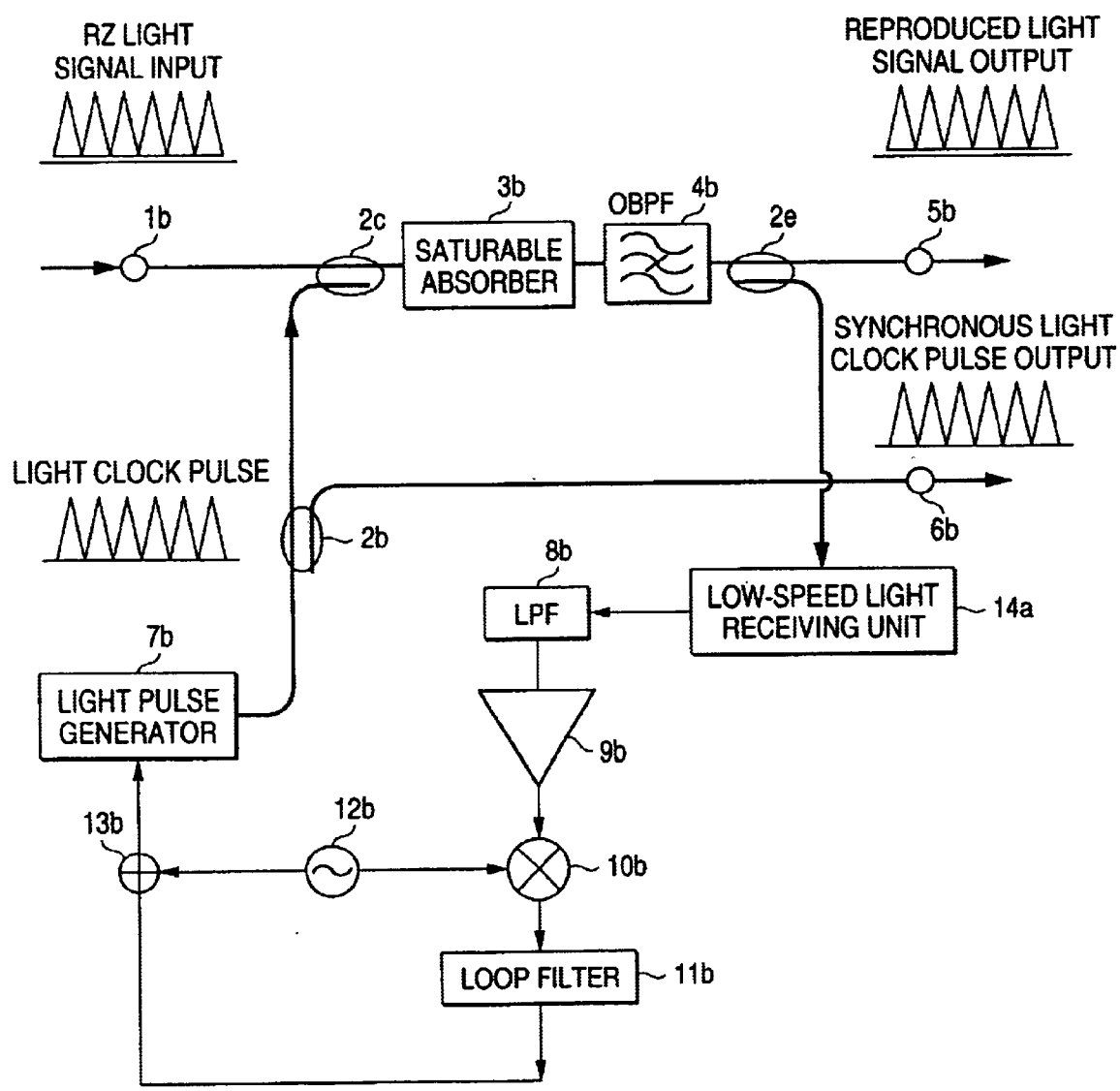
FIG. 2 is a block diagram showing an embodiment 2.

FIG. 2 is a structural block diagram showing a light receiver according to the present invention. In FIG. 2, numeral 1b is a light data input terminal, numerals 2c, 2d and 2e are light wave-composing and branching units, numeral 3b is a light saturable absorber, numeral 4b is an optical band pass filter (OBPF), numeral 5b is a light data output terminal, numeral 6b is a light clock output terminal, numeral 7b is a light pulse generator which can change the repeated frequency by the input current/voltage, numeral 8b is a low pass filter(LPF), numeral 9b is a reversible or irreversible amplifier, numeral 10b is a synchronous detector, numeral 11b is a loop filter, numeral 12b is a low frequency dither signal source, numeral 13b is a current/voltage adder, and numeral 14a is a light receiving unit to conduct the photo-electric conversion.

As light wave-composing and branching units 2c, 2d and 2e, a photo coupler, plane light waveguide path, wavelength multiple wave-composing and branching unit, can be used. The light saturable absorber, numeral 3b, is, for example, an EA modulator, or semiconductor light amplifier. The light pulse generator 7b is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation.

Next, the operation of FIG. 2 will be described. The operation of the present embodiment 2 is the same as the embodiment 1 in FIG. 1 except that the phase difference signal of the light signal and the light clock pulse light source is detected in such a manner that a portion of the reproduced light data output outputted from the saturable absorber is photo-electrically converted by the light receiving unit 14a, and because the phase comparison of both the light signals and the coding of the light clock pulse by the light signal pulse are simultaneously conducted in one light saturable absorber, in the same manner as in the embodiment 1 in FIG. 1, the present embodiment 2 operates as the light receiver (light 3R receiver) in which the phase adjustment is not necessary, and the high sped electric circuit is not necessary.

Embodiment 3

Figure 3:
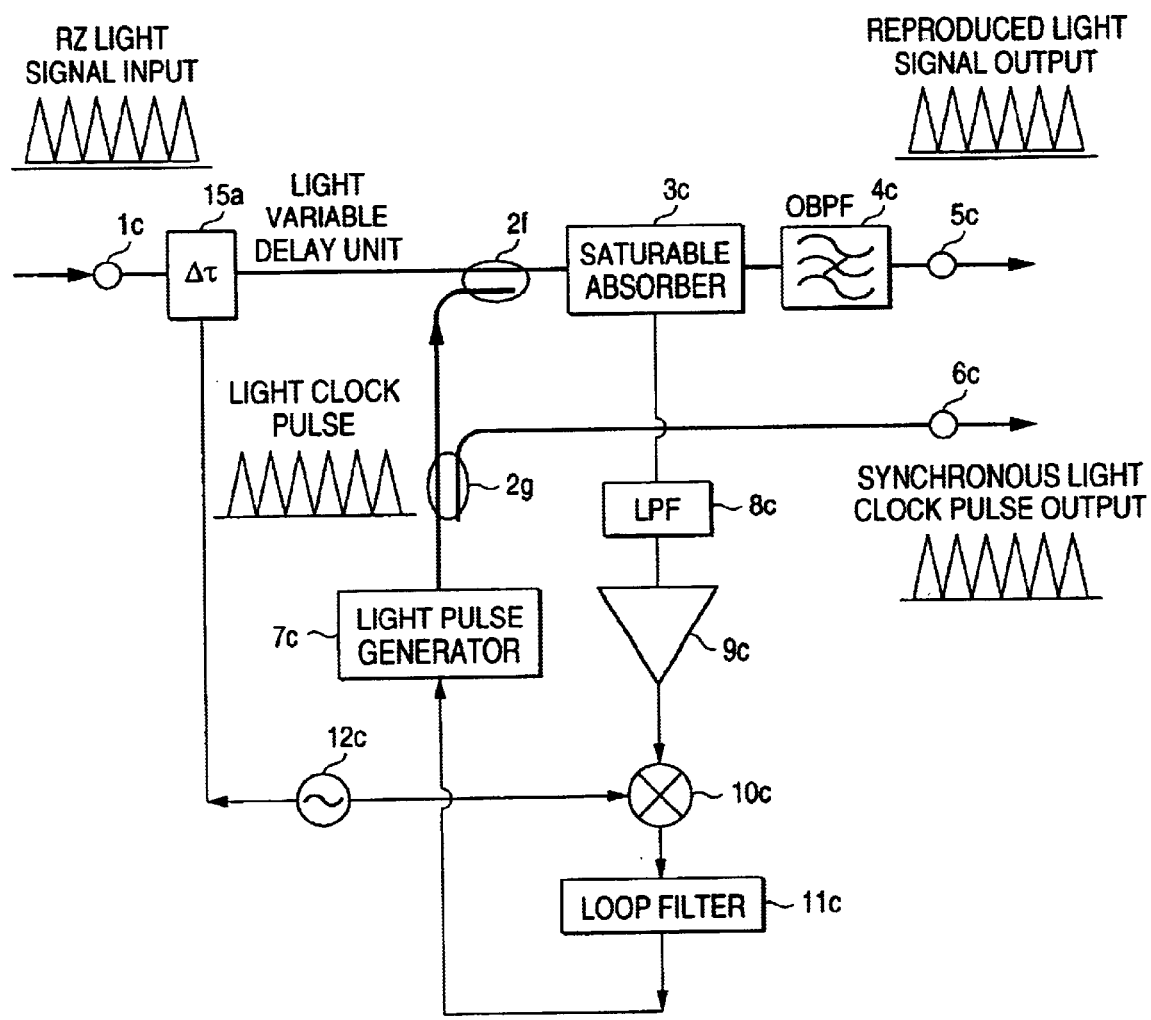
FIG. 3 is a block diagram showing an embodiment 3.

FIG. 3 is a structural block diagram showing a light receiver according to the present invention. In FIG. 3, numeral 1c is a light data input terminal, numerals 2f and 2g are light wave-composing and branching units, numeral 3c is a light saturable absorber, numeral 4c is an optical band pass filter (OBPF), numeral 5c is a light data output terminal, numeral 6c is a light clock output terminal, numeral 7c is a light pulse generator which can change the repeated frequency by the input current/voltage, numeral 8c is a low pass filter(LPF), numeral 9c is a reversible or irreversible amplifier, numeral 10c is a synchronous detector, numeral 11c is a loop filter, numeral 12c is a low frequency dither signal source, and numeral 15a is a light delay unit in which the delay amount can be controlled by the input current or voltage.

As light wave-composing and branching units 2f and 2g, a photo coupler, plane light waveguide path, or wavelength multiple wave-composing and branching unit, can be used. The light saturable absorber, numeral 3c, is, for example, an EA modulator, or semiconductor light amplifier. The light pulse generator 7c is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation. The light delay line 15a can be easily procured from the market.

The operation of the present embodiment is the same as in the embodiment in FIG. 1, except that the phase modulation for the synchronization establishment at the optimum phase is superimposed on the input signal light side by using the light delay line, and in contrast to a fact that, in the embodiment 1 in FIG. 1, unnecessary phase modulation component is superimposed on the reproduced light data output and the clock output according to circumstances, in the embodiment 3 in FIG. 3, the input light signal light, which is finally discarded, is phase modulated, thereby, the reproduced light signal output and clock light output, which have lesser phase jitter, can be obtained. According to the above description, in the same manner as in the embodiment 1, because the phase comparison of both the light signals and the coding of the light clock pulse by the light signal pulse are simultaneously conducted in one light saturable absorber, the present embodiment 2 operates as the light receiver (light 3R receiver) in which the phase adjustment is not necessary, and the high speed electric current is not necessary.

Embodiment 4

Figure 5:
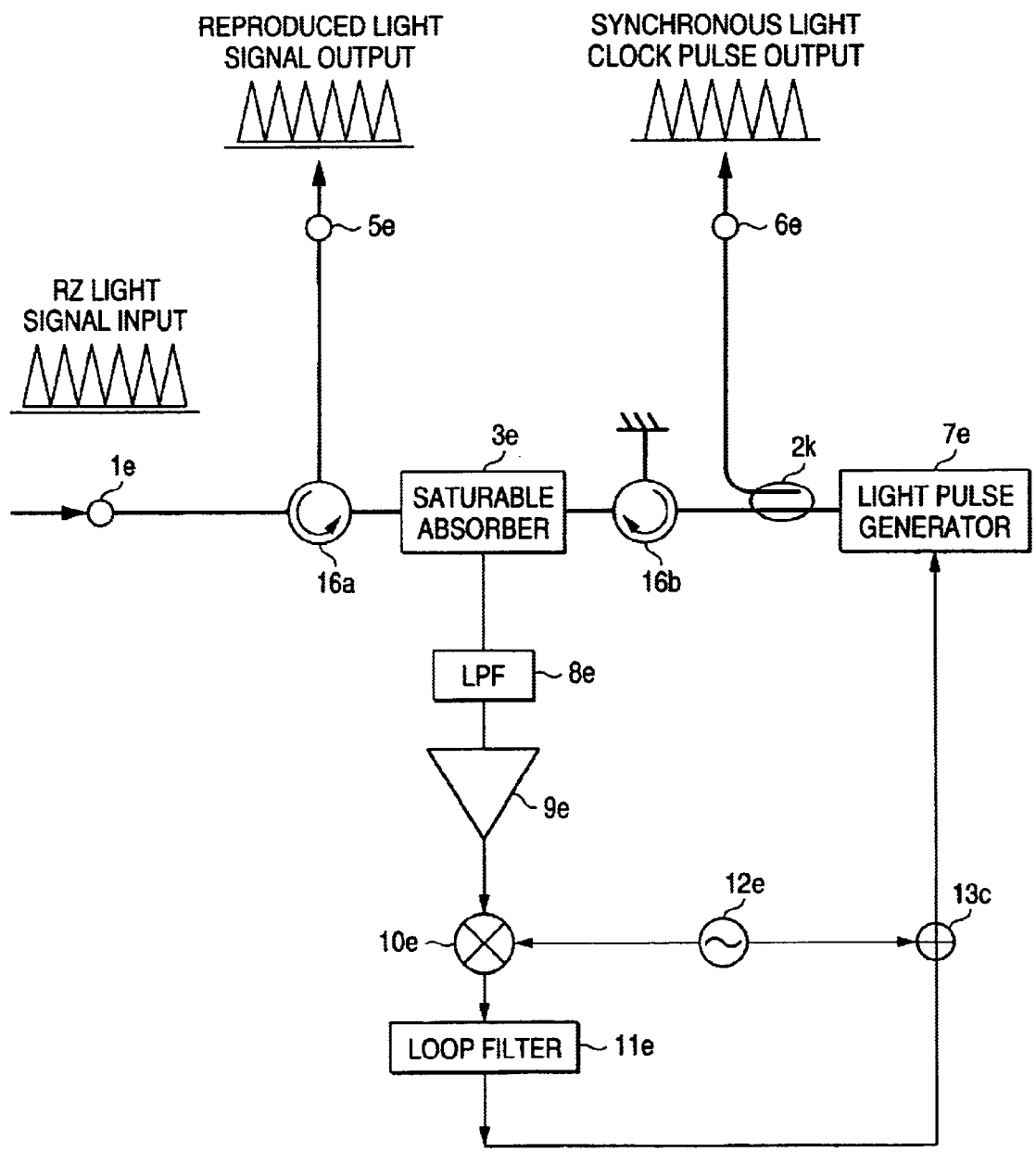
FIG. 5 is a block diagram showing an embodiment 5.

FIG. 5 is a structural block diagram showing a light receiver according to the present invention. In FIG. 5, numeral 1e is a light data input terminal, numeral 2k is a light wave-composing and branching unit, numeral 3e is a light saturable absorber, numeral 5e is a light data output terminal, numeral 6e is a light clock output terminal, numeral 7e is a light pulse generator which can change the repeated frequency by the input current/voltage, numeral 8e is a low pass filter (LPF), numeral 9e is a reversible or irreversible amplifier, numeral 10e is a synchronous detector, numeral 11e is a loop filter, numeral 12e is a low frequency dither signal source, numeral 13c is a current/voltage adder, and numeral 16a and 16b are a light circulators.

As light wave-composing and branching units 2h, 2i and 2j, a photo coupler, plane light waveguide path, or wavelength multiple wave-composing and branching unit, can be used. The light saturable absorber, numeral 3d, is, for example, an EA modulator, or semiconductor light amplifier. The light pulse generator 7d is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation. The light delay line 15b can be easily procured from the market.

Next, the operation of FIG. 4 will be described.

Figure 4:
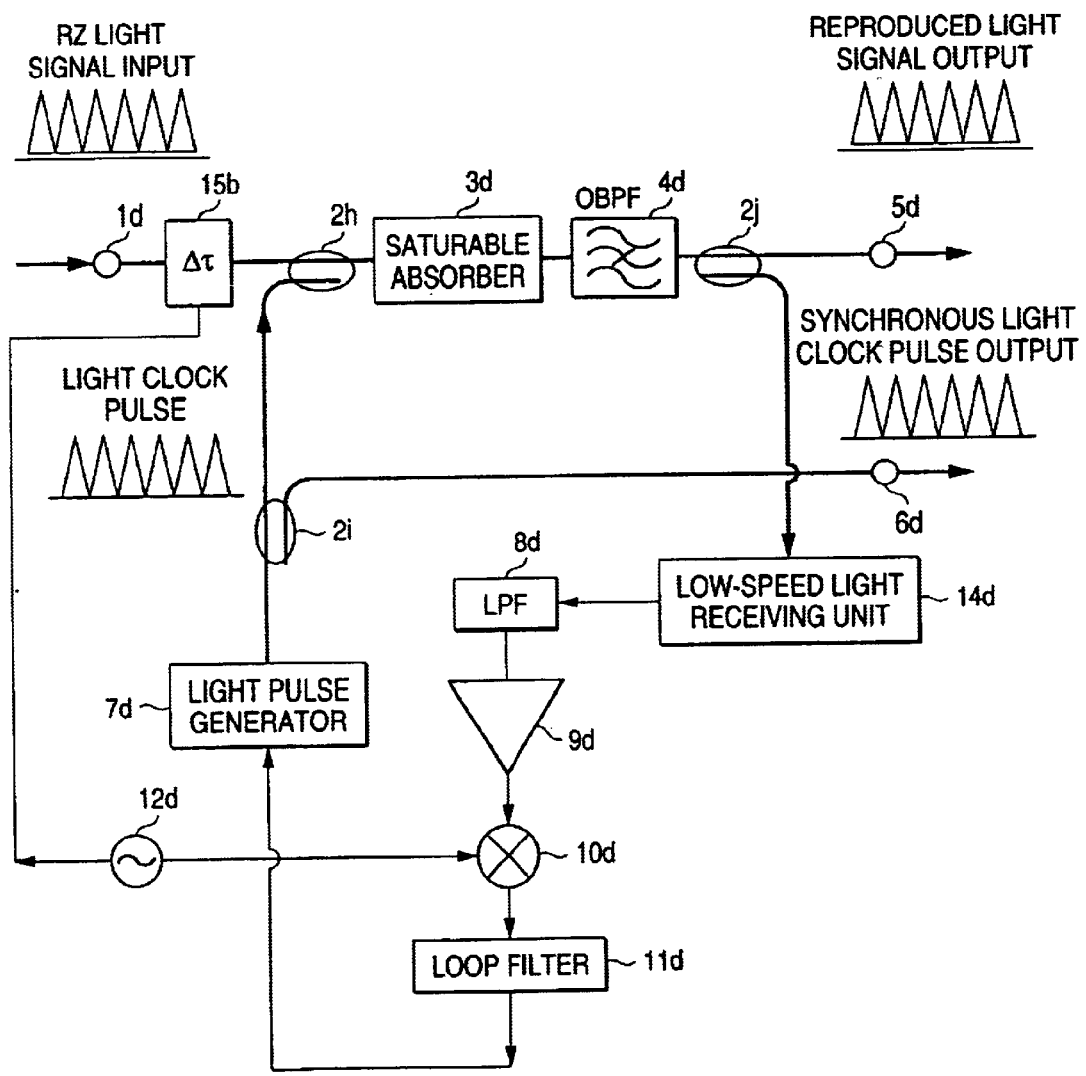
FIG. 4 is a block diagram showing an embodiment 4.

The operation of the present embodiment 4 is the same as in the embodiment in FIG. 2, except that the phase modulation for the synchronization establishment at the optimum phase is superimposed on the input signal light side by using the light delay line, and in contrast to a fact that, in the embodiment 2 in FIG. 2, unnecessary phase modulation component is superimposed on the reproduced light data output and the clock output according to circumstances, in the embodiment 4 in FIG. 4, because the input light signal light, which is finally discarded, is phase modulated, thereby, the reproduced light signal output and clock light output, which have lesser phase jitter, can be obtained. According to the above description, in the same manner as in the embodiment 2, because the phase comparison of both the light signals and the coding of the light clock pulse by the light signal pulse are simultaneously conducted in one light saturable absorber, the present embodiment 4 operates as the light receiver (light 3R receiver) in which the phase adjustment is not necessary, and the high sped electric circuit is not necessary.

Embodiment 5

FIG. 5 is a structural block diagram showing a light receiver according to the present invention. In FIG. 5, numeral 1e is a light data input terminal, numeral 2k is a light wave-composing and branching unit, numeral 3e is a light saturable absorber, numeral 5e is a light data output terminal, numeral 6e is a light clock output terminal, numeral 7e is a light pulse generator which can change the repeated frequency by the input current/voltage, numeral 8e is a low pass filter(LPF), numeral 9e is a reversible or irreversible amplifier, numeral 10e is a synchronous detector, numeral 11e is a loop filter, numeral 12e is a low frequency dither signal source, numeral 13e is a current/voltage adder, and numeral 16a and 16b are a light circulators.

As a light wave-composing and branching unit 2k, a photo coupler, plane light waveguide path, or wavelength multiple wave-composing and branching unit, can be used. The light saturable absorber, numeral 3e, is, for example, an EA modulator, or semiconductor light amplifier. The light pulse generator 7e is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation.

Next, the operation of FIG. 5 will be described. Although, in the embodiment in FIG. 1, the light signal and the light clock pulse are inputted into the saturable absorber from the same direction, FIG. 5 is structured such that these are inputted from the reverse direction, and by using the light circulator, not the optical filter, the light signal and the light clock pulse are separated. The other operations are the same as those in the embodiment 1 in FIG. 1. In the structure in FIG. 5, because the operations in the embodiment 1 in FIG. 1 can be realized by the smaller number of the light wave-composing and branching units, the photoelectric power of the signal light can be effectively utilized. According to the operations as described above, because the phase comparison of both the light signals and the coding of the light clock pulse by the light signal pulse are simultaneously conducted in one light saturable absorber, the present embodiment 5 as shown in FIG. 5 operates as the light receiver (light 3R receiver) in which the phase adjustment is not necessary, and the high sped electric circuit is not necessary.

Embodiment 6

Figure 6:
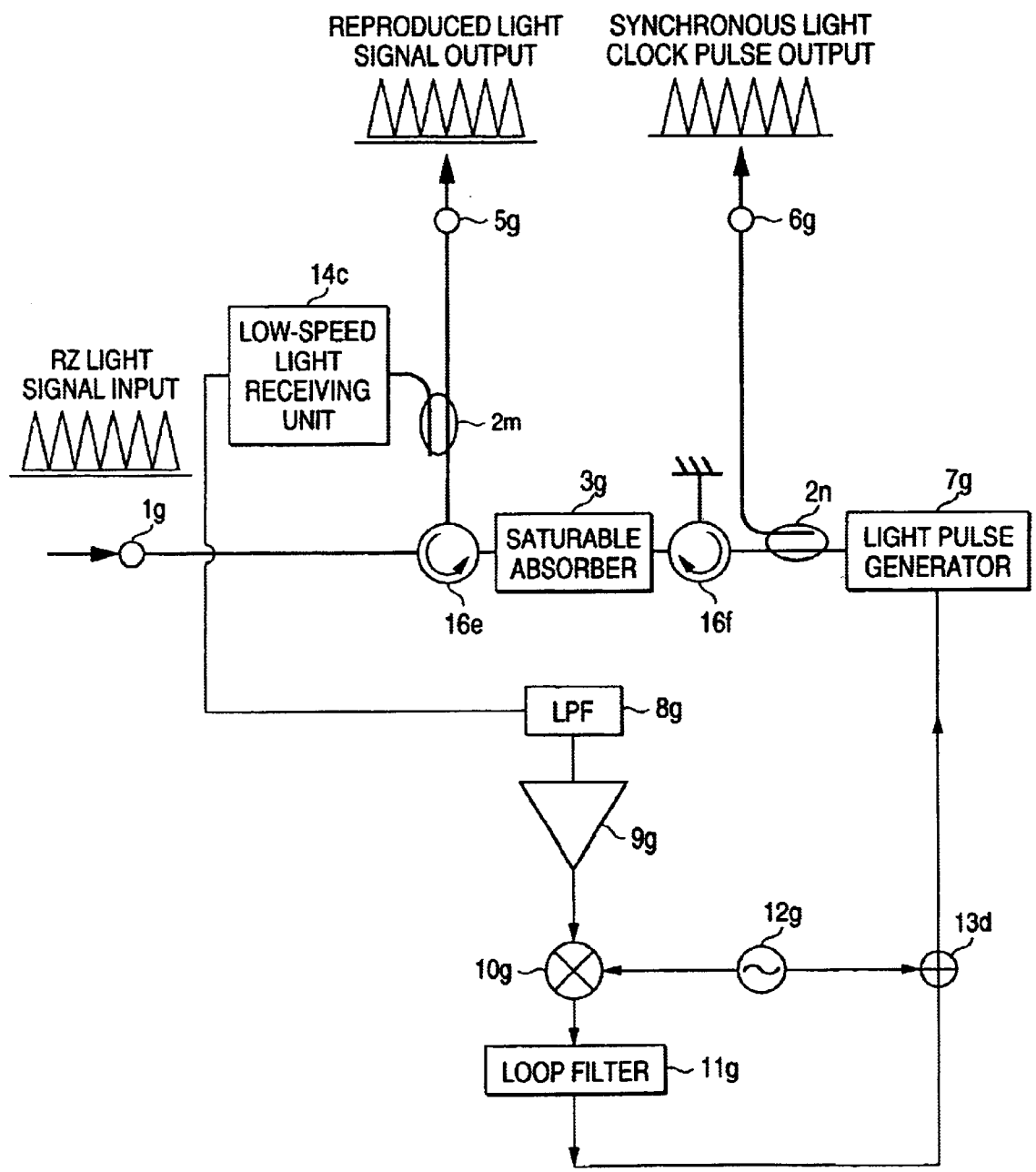
FIG. 6 is a block diagram showing an embodiment 6.

FIG. 6 is a structural block diagram showing a light receiver according to the present invention. In FIG. 6, numeral 1g is a light data input terminal, numeral 2m and 2n are light wave-composing and branching units, numeral 3g is a light saturable absorber, numeral 5g is a light data output terminal, numeral 6g is a light clock output terminal, numeral 7g is a light pulse generator which can change the repeated frequency by the input current/voltage, numeral 8g is a low pass filter (LPF), numeral 9g is a reversible or irreversible amplifier, numeral 10g is a synchronous detector, numeral 11g is a loop filter, numeral 12g is a low frequency dither signal source, numeral 13d is a current/voltage adder, numeral 14c is a light receiving unit to conduct the photoelectric conversion, and numeral 16e and 16f are a light circulators.

As light wave-composing and branching units 2m and 2n, a photo coupler, plane light waveguide path, or wavelength multiple wave-composing and branching unit, can be used. The light saturable absorber, numeral 3g, is, for example, an EA modulator, or semiconductor light amplifier. The light pulse generator 7g is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation.

Next, the operation of FIG. 6 will be described. Although, in the embodiment 2 in FIG. 2, the light signal and the light clock pulse are inputted into the saturable absorber from the same direction, FIG. 6 is structured such that these are inputted from the reverse direction, and by using the light circulator, not the optical filter, the light signal and the light clock pulse are separated. The other operations are the same as those in the embodiment 2 in FIG. 2. In the structure in FIG. 6, because the operations in the embodiment 2 in FIG. 2 can be realized by the smaller number of the light wave-composing and branching units, the photoelectric power of the signal light can be effectively utilized. According to the operations as described above, because the phase comparison of both the light signals and the coding of the light clock pulse by the light signal pulse are simultaneously conducted in one light saturable absorber, the present embodiment 6 as shown in FIG. 6 operates as the light receiver (light 3R receiver) in which the phase adjustment is not necessary, and the high sped electric circuit is not necessary.

Embodiment 7

Figure 7:
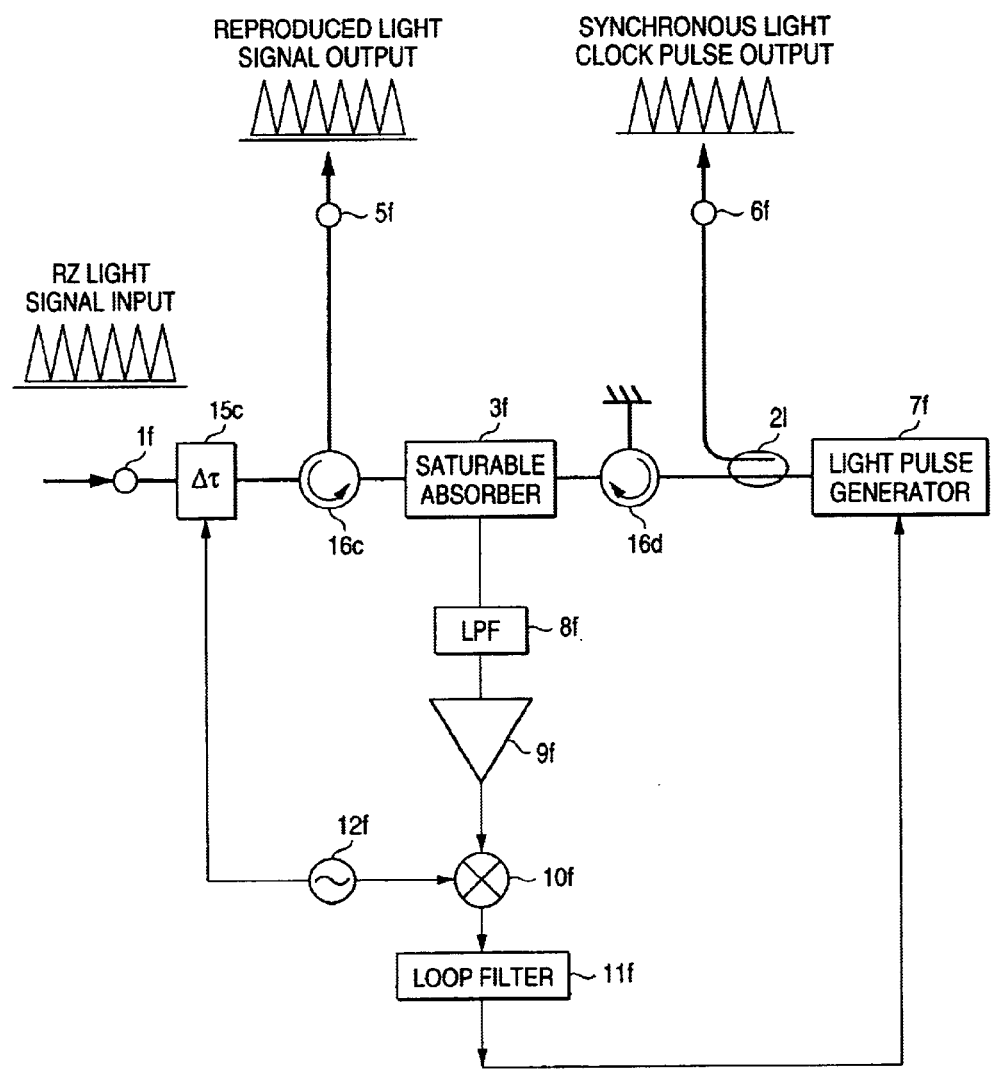
FIG. 7 is a block diagram showing an embodiment 7.

FIG. 7 is a structural block diagram showing a light receiver according to the present invention. In FIG. 7, numeral if is a light data input terminal, numeral 21 is a light wave-composing and branching unit, numeral 3f is a light saturable absorber, numeral 5f is a light data output terminal, numeral 6f is a light clock output terminal, numeral 7f is a light pulse generator which can change the repeated frequency by the input current/voltage, numeral 8f is a low pass filter(LPF), numeral 9f is a reversible or irreversible amplifier, numeral 10f is a synchronous detector, numeral 11f is a loop filter, numeral 12f is a low frequency dither signal source, numeral 15c is a light delay unit in which the delay amount can be controlled by the input current or voltage, and numeral 16c and 16d are a light circulators.

As a light wave-composing and branching unit 21, a photo coupler, plane light waveguide path, or wavelength multiple wave-composing and branching unit, can be used. The light saturable absorber, numeral 3f, is, for example, an EA modulator, or semiconductor light amplifier. The light pulse generator 7f is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation. The light delay line 15c can be easily procured from the market.

Next, the operation of FIG. 7 will be described. Although, in the embodiment 3 in FIG. 3, the light signal and the light clock pulse are inputted into the saturable absorber from the same direction, FIG. 7 is structured such that these are inputted from the reverse direction, and by using the light circulator, not the optical filter, the light signal and the light clock pulse are separated. The other operations are the same as those in the embodiment 3 in FIG. 3. In the structure in FIG. 7, because the operations in the embodiment 3 in FIG. 13 can be realized by the smaller number of the light wave-composing and branching units, the photoelectric power of the signal light can be effectively utilized. According to the operations as described above, because the phase comparison of both the light signals and the coding of the light clock pulse by the light signal pulse are simultaneously conducted in one light saturable absorber, the present embodiment 7 as shown in FIG. 7 operates as the light receiver (light 3R receiver) in which the phase adjustment is not necessary, and the high sped electric circuit is not necessary.

Embodiment 8

Figure 8:
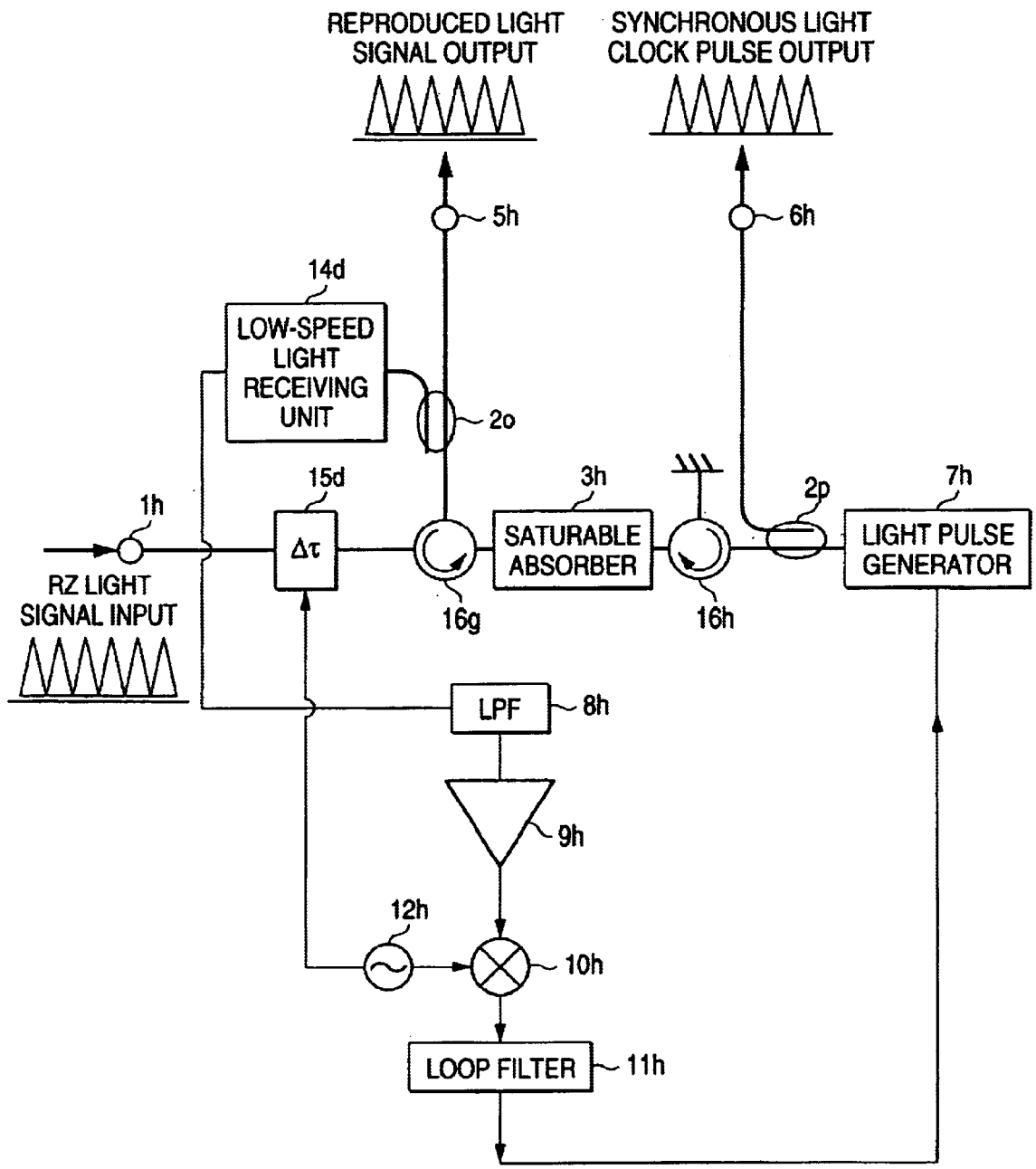
FIG. 8 is a block diagram showing an embodiment 8.

FIG. 8 is a structural block diagram showing a light receiver according to the present invention. In FIG. 8, numeral 1h is a light data input terminal, numerals 2o and 2p are light wave-composing and branching units, numeral 3h is a light saturable absorber, numeral 5h is a light data output terminal, numeral 6h is a light clock output terminal, numeral 7h is a light pulse generator which can change the repeated frequency by the input current/voltage, numeral 8h is a low pass filter(LPF), numeral 9h is a reversible or irreversible amplifier, numeral 10h is a synchronous detector, numeral 11h is a loop filter, numeral 12h is a low frequency dither signal source, numeral 14d is a light receiving unit to conduct the photoelectric conversion, numeral 15d is a light delay unit in which the delay amount can be controlled by the input current or voltage, and numeral 16g and 16h are a light circulators.

As light wave-composing and branching units 2o and 2p, a photo coupler, plane light waveguide path, or wavelength multiple wave-composing and branching unit, can be used. The light saturable absorber, numeral 3h, is, for example, an EA modulator, or semiconductor light amplifier. The light pulse generator 7h is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation. The light delay line 15d can be easily procured from the market.

Next, the operation of FIG. 8 will be described. Although, in the embodiment 4 in FIG. 4, the light signal and the light clock pulse are inputted into the saturable absorber from the same direction, FIG. 8 is structured such that these are inputted from the reverse direction, and by using the light circulator, not the optical filter, the light signal and the light clock pulse are separated. The other operations are the same as those in the embodiment 4 in FIG. 4. In the structure in FIG. 8, because the operations in the embodiment 4 in FIG. 4 can be realized by the smaller number of the light wave-composing and branching units, the photoelectric power of the signal light can be effectively utilized. According to the operations as described above, because the phase comparison of both the light signals and the coding of the light clock pulse by the light signal pulse are simultaneously conducted in one light saturable absorber, the present embodiment 8 as shown in FIG. 8 operates as the light receiver (light 3R receiver) in which the phase adjustment is not necessary, and the high sped electric circuit is not necessary.

Embodiment 9

Figure 9:
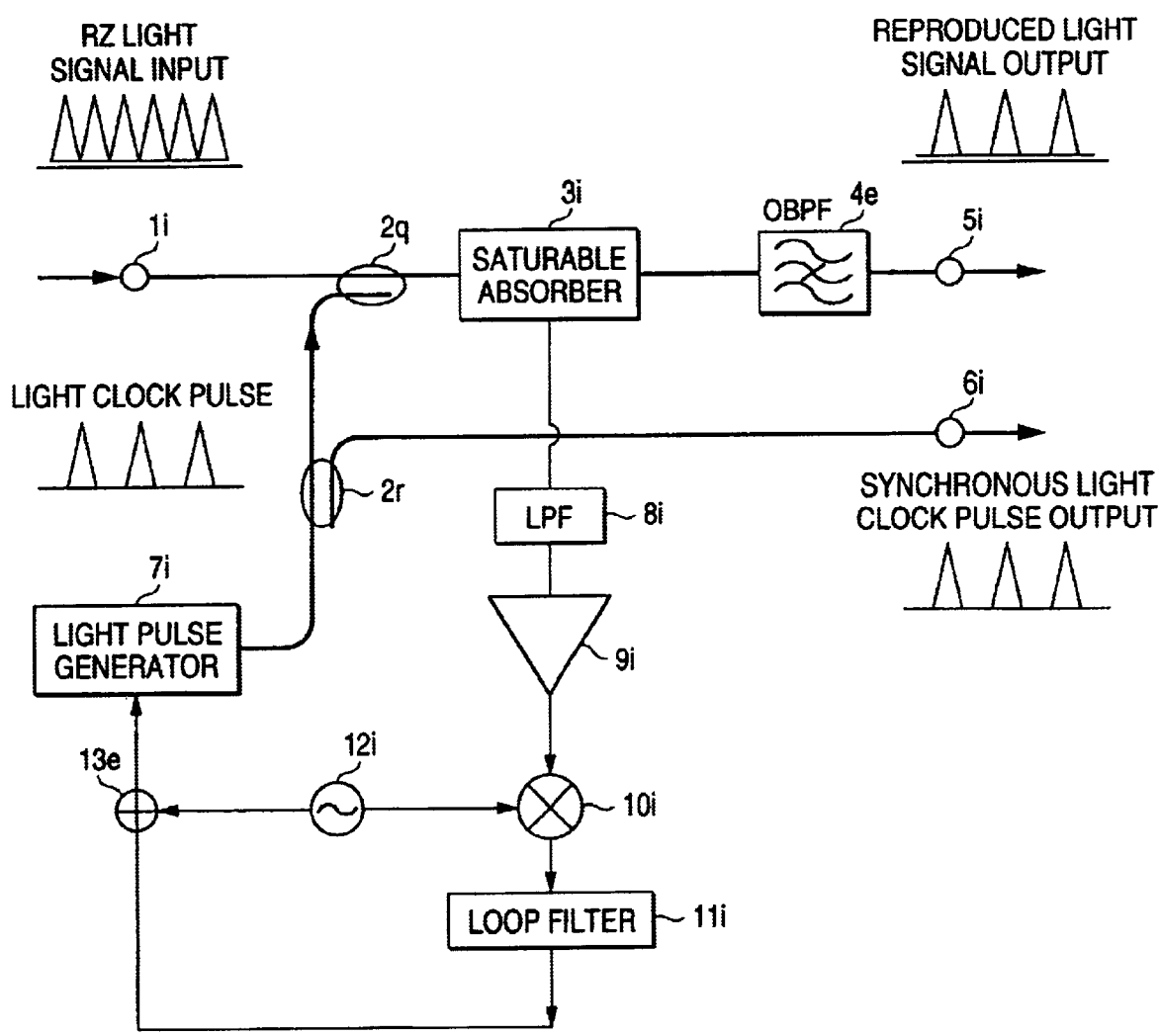
FIG. 9 is a block diagram showing an embodiment 9.

FIG. 9 is a structural block diagram showing a light receiver according to the present invention. In FIG. 9, numeral 1i is a light data input terminal, numerals 2q and 2r are light wave-composing and branching units, numeral 3i is a light saturable absorber, numeral 4e is an optical band pass filter (OBPF), numeral 5i is a light data output terminal, numeral 6i is a light clock output terminal, numeral 7i is a light pulse generator which can change the repeated frequency by the input current/voltage, numeral 8i is a low pass filter (LPF), numeral 9i is a reversible or irreversible amplifier, numeral 10i is a synchronous detector, numeral 11i is a loop filter, numeral 12i is a low frequency dither signal source, and numeral 13e is a current/voltage adder.

As light wave-composing and branching units 2q and 2r, a photo coupler, plane light waveguide path, or wavelength multiple wave-composing and branching unit, can be used. The light saturable absorber, numeral 3i, is, for example, an EA modulator, or semiconductor light amplifier. The light pulse generator 7i is, for example, a mode lock laser by which the pulse repeated frequency can be changed by the injection current or impressed voltage, or as shown in FIG. 10, a unit which is structured by the combination of an electric VCO, light modulator, and light source, can be used. In the latter structure, although it is necessary to use the high speed electric clock signal, it is not necessary to compensate for the phase variation.

Next, the operation of FIG. 9 will be described. In FIG. 9, the repeated frequency of the light clock pulse generation light source is 1/n (n is a natural number) of the bit rate of the signal light in the embodiment 1 in FIG. 1. Because the phase comparison operation of the saturable absorber can be conducted in the same manner, also in such the case, the embodiment 9 shown in FIG. 9 conducts the phase comparison of both the light signals and the coding of the light clock pulse by the light signal pulse simultaneously in one light saturable absorber, and operates as the light receiver (light 3R receiver) which conducts the separation of the multiple light signal, reproduction of the dividing light clock pulse, and the separated light pulse reproduction.

What is claimed is:

1. Amended) A light receiver comprising:
    a light clock pulse generation light source for outputting a light clock pulse, a frequency of a the light clock pulse being controlled according to an input current or input voltage to the light clock pulse generation light source;
    a wave-branching means for wave-branching the light clock pulse from the clock pulse generation light source into a first clock pulse having a wavelength of $\lambda_2$ and a second clock pulse having a wavelength of $\lambda_2$;
    an output means for outputting the first clock pulse to a light clock output terminal;
    a wave-composing means for wave-composing the second clock pulse with a light signal having a wavelength of $\lambda_1$ inputted from an input terminal, the wave-composing means for outputting a composed light signal;
    a light saturable absorber absorbing the composed light signal and outputting a photo current, and in which a light absorption coefficient is decreased corresponding to a level of the composed light signal;
    an optical filter for separating the composed light signal outputted from the light saturable absorber into a first light signal having a wavelength of $\lambda_1$ and a second light signal having a wavelength of $\lambda_2$;
    a dither signal source for modulating a phase of the light clock pulse generated by the clock pulse generation light source by a dither signal; and
    a phase controller for controlling so that a phase difference between the light clock pulse generated by the light clock pulse generation light source and the light signal inputted from the input terminal is substantially 0°, according to the photo current output from the light saturable absorber and an output of the dither signal source.

2. A light receiver, comprising:

a light clock pulse generation light source for outputting a light clock pulse, a frequency of the light clock pulse being controlled according to an input current or input voltage to the light clock pulse generation light source;

a wave-branching means for wave-branching the light clock pulse from the clock pulse generation light source into a first clock pulse having a wavelength of $\lambda_1$ and a second clock pulse having a wavelength of $\lambda_2$;

an output means for outputting the first clock pulse to a light clock output terminal;

a wave-composing means for wave-composing the second clock pulse with a light signal inputted from an input terminal, the wave-composing means for outputting a composed light signal;

a light saturable absorber absorbing the composed light signal and Outputting a photo current, and in which a light absorption coefficient is decreased corresponding to a level of the composed light signal;

an optical filter for separating the composed light signal outputted from the light saturable absorber into a first light signal having a wavelength of $\lambda_1$ and a second light signal having a wavelength of $\lambda_2$;

a light receiving unit for electrically converting the second light signal output from the optical filter;

a dither signal source for modulating a phase of the light clock pulse generated from the clock pulse generation light source by a dither signal; and a phase controller for controlling so that a phase difference between the light clock pulse generated by the light clock pulse generation light source and the signal light inputted from the input terminal is substantially 0°, according to an output of the light receiving unit and an output of the dither signal source.

3. The light receiver according to claim 1, further comprising:

a light variable delay unit for controlling a delay amount of the input light signal according to the input current or the input voltage, and a dither signal source for modulating the input light signal by the dither signal.

4. The light receiver according to claim 2, further comprising:

a light variable delay unit for controlling a delay amount of the input light signal according to the input current or the input voltage, and a dither signal source for modulating the input light signal by the dither signal.

5. A light receiver comprising:

a light saturable absorber:

a first light circulator for outputting an inputted light signal to the light saturable a absorber, the first light circulator for outputting a light pulse reproduced by the light saturable absorber;

a second light circulator for terminating a light signal outputted from the light saturable absorber, the second light circulator for outputting a light clock pulse to the light saturable absorber;

a light clock pulse generation light source for controlling a frequency of the light clock pulse according to an input current or input voltage;

a wave-branching means for wave-branching the light clock pulse from the light clock pulse generation light source into a first clock pulse and a second clock pulse, wherein the second clock pulse wave-branched by the wave-branching means is output from the second light circulator to the light saturable absorber, wherein the light saturable absorber outputs a reproduced light signal through the first light circulator;

an output means for outputting the first clock pulse wave-branched by the wave-branching means to an output terminal; and a phase controller for synchronizing a phase of the light clock pulse generated by the light clock pulse generation light source with the phase of the signal light inputted from the input terminal, according to an output of the light saturable absorber used for generating a photo current.

6. A light receiver comprising:

a first light circulator for outputting an inputted signal light to a light saturable absorber;

a second light circulator for terminating a light signal outputted from the light saturable absorber;

a light clock pulse generation light source for controlling a frequency of a light clock pulse according to an input current or input voltage, the light clock pulse generation light source for outputting a light clock pulse;

a wave-branching means for wave-branching the light clock pulse from the light clock pulse generation light source into a first light clock pulse and a second light clock pulse;

an output means for outputting the first light clock pulse wave-branched by the wave-branching means to a light clock output terminal;

a light receiving unit for wave-branching the light signal from the first light circulator and for electrically converting the light signal therefrom; and a phase controller for synchronizing a phase of the light source generated by the light clock pulse generation light source with a phase of the signal light inputted from the input terminal, according to an output of the light receiving unit and a dither signal, wherein the light saturable absorber outputs the second light clock pulse wave-branched by the wave-branching means and the light signal from the second light circulator to the first light circulator.

7. The light receiver according to claim 5 further comprising:

a light variable delay unit for controlling a delay amount of the input light signal according to the input current or input voltage; and a dither signal source for modulating a phase of the input light signal by the dither signal.

8. The light receiver according to claim 6 further comprising:

a light variable delay unit for controlling a delay amount of the input light signal according to the input current or input voltage; and a dither signal source for modulating a phase of the input light signal by the dither signal.

9. The light receiver according to claim 1, wherein the frequency of the light clock pulse generation light source is 1/n of a bit rate of the input light signal, where n is a natural number.

10. The light receiver according to claim 2, wherein the frequency of the light clock pulse generation light source is 1/n of a bit rate of the input light signal, where n is a natural number.

11. The light receiver according to claim 3, wherein the frequency of the light clock pulse generation light source is 1/n of a bit rate of the input light signal, where n is a natural number.

12. The light receiver according to claim 4, wherein the frequency of the light clock pulse generation light source is 1/n of a bit rate of the input light signal, where n is a natural number.

13. The light receiver according to claim 5, wherein the frequency of the light clock pulse generation light source is 1/n of a bit rate of the input light signal, where n is a natural number.

14. The light receiver according to claim 6, wherein the frequency of the light clock pulse generation light source is 1/n of a bit rate of the input light signal, where n is a natural number.

15. The light receiver according to claim 7, wherein the frequency of the light clock pulse generation light source is 1/n of a bit rate of the input light signal, where n is a natural number.

16. The light receiver according to claim 8, wherein the frequency of the light clock pulse generation light source is 1/n of a bit rate of the input light signal, where n is a natural number.

17. A light receiver comprising:
a light saturable absorber having a light absorption characteristic based on a received input light signal and light clock pulse signal, such that the light saturable absorber is operable to absorb the light clock pulse signal when the input light signal is at a low level and to allow the light clock pulse signal to pass as an output light signal when the input light signal is at a high level; and
a phase controller configured to synchronize the phases of the input light signal and the light clock pulse signal based on operations of the light saturable absorber.

18. The light receiver according to claim 17, further comprising:
a light pulse generator configured to generate the light clock pulse signal based on a control signal received from the phase controller,
wherein the phase controller produces a control signal for controlling the light pulse generator, the control signal causing the light pulse generator to adjust the phase of light clock pulse signal so that a phase difference between the light clock pulse signal and the input light signal is reduced.

19. The light receiver according to claim 17, wherein
the phase controller is configured to receive a light absorption current generated by the light saturable absorber, the light absorption current being indicative of the phase difference between the light clock pulse signal and the input light signal, the phase controller further being configured to generate the control signal based on the light absorption current.

20. The light receiver according to claim 17, further comprising:
a light receiving unit configured to convert the output light signal from the light saturable absorber into a photoelectric signal,
wherein the phase controller is configured to receive the photoelectric signal, the photoelectric signal being indicative of the phase difference between the light clock pulse signal and the input light signal, the phase controller further being configured to generate the control signal based on the photoelectric signal.

21. The light receiver according to claim 17, wherein the light absorption characteristic of the light saturable absorber is a light absorption coefficient that decreases as an accumulated signal level of the input light signal and light clock pulse signal increases.

22. The light receiver according to claim 21, further comprising:
a wave-composing means for wave-composing the input light signal with the light clock pulse signal to output a composed light signal having the accumulated signal level, the composed light signal being received by the light saturable absorber.

23. The light receiver according to claim 21, further comprising:
a first light circulator operably connected to the light saturable absorber, the first light circulator being configured to send the input light signal from a light data input terminal to the light saturable absorber and to send the output light signal from the light saturable absorber to a light data output terminal; and
a second light circulator operably connected to the light saturable absorber, the second light circulator being configured to send the light clock pulse signal from a light pulse generator to the light saturable absorber and to terminate the output light signal from the light saturable absorber.

24. The light receiver according to claim 17, further comprising:
a dither signal source operable to produce a dither signal for modulating a phase of at least one of the input light signal and the light clock pulse signal, the dither signal source being controlled by a control signal produced by the phase controller.

25. The: light receiver according to claim 24, the dither signal being operable to modulate the phase of the input light signal, the light receiver further comprising:
a light variable delay unit configured to control a time delay associated with the input light signal based on the control signal.

26. The light receiver according to claim 17, further comprising:
a light pulse generator configured to generate the light clock pulse signal so that a frequency of the light clock pulse signal is 1/n of a bit rate associated with the input light signal, n being a natural number.

* * * * *